US005417132A

United States Patent [19]

Cox et al.

[11] Patent Number: 5,417,132

[45] Date of Patent: May 23, 1995

[54] ROTARY CUTTING DIES

[75] Inventors: William A. Cox, West Bloomfield, Mich.; Alan R. Pfaff, 3512 MacNichol Trail, Orchard Lake, Mich. 48323

[73] Assignee: Alan R. Pfaff, Orchard Lake, Mich.

[21] Appl. No.: 78,679

[22] Filed: Jun. 16, 1993

Related U.S. Application Data

[63] Continuation-in-part of Ser. No. 2,660, Jan. 19, 1993, abandoned.

[51] Int. Cl.$^6$ .......................... B23D 25/12; B26D 1/62

[52] U.S. Cl. .......................................... 83/116; 83/345; 83/674

[58] Field of Search ................. 83/115, 116, 123, 343, 83/344, 345, 663, 669, 670, 673, 674

[56] References Cited

U.S. PATENT DOCUMENTS

| | | | |
|---|---|---|---|
| 1,110,238 | 9/1914 | Spiegel | 83/345 X |
| 3,322,012 | 5/1967 | Murray | 83/345 X |
| 3,485,146 | 12/1969 | Sarka | 83/343 X |
| 3,578,761 | 5/1971 | Sarka | 83/343 |
| 4,224,851 | 9/1980 | Imai | 83/123 X |
| 4,561,334 | 12/1985 | Sarka | 83/27 |
| 4,597,317 | 7/1986 | Heyden | 83/346 |
| 4,608,895 | 9/1986 | Bell | 83/345 |
| 4,770,078 | 9/1988 | Gautier | 83/348 |
| 5,067,380 | 11/1991 | Seefeldt | 83/481 |

*Primary Examiner*—Eugenia Jones

*Attorney, Agent, or Firm*—Barnes, Kisselle, Raisch, Choate, Whittemore & Hulbert

[57] ABSTRACT

A pair of rotary die cylinders with lands having coacting cutting edges which cut blanks from a web of material passing through the nip of the rotating dies. In cross section each land has an outer face and a pair of spaced apart side faces which are parallel to each other and perpendicular to the chord of the outer face to provide a clean cut and facilitate release of the cut blank from the cutting blades as it emerges from the nip of the dies. The die cylinders are journalled for rotation by recesses with frusto conical locating surfaces in their opposed ends. Each die cylinder is made by machining the recesses in the opposed ends of a generally cylindrical workpiece of tool steel and then utilizing the recesses to locate and orient the workpiece relative to a cutting tool to produce a cylindrical surface on the workpiece concentric with the axis of the recesses and then to machine away portions of the periphery of the cylindrical surface to form the cutting blade lands thereon. After machining is completed the cutting blade lands may be hardened by heat treating utilizing a laser beam directed onto the lands to heat them at an elevated temperature so that upon quenching they are hardened without any substantial hardening and resulting distortion of the core or body of the workpiece.

9 Claims, 3 Drawing Sheets

ROTARY CUTTING DIES

REFERENCE TO A APPLICATION

This is a continuation-in-part of U.S. patent application Ser. No. 08/002,660 filed on Jan. 11, 1993, now abandoned, the disclosure of which is incorporated herein by reference.

FIELD OF THE INVENTION

This invention relates to rotary die cutting of blanks from thin sheets or webs of material, and more particularly to improved rotary cutting dies and a method of making them.

BACKGROUND OF THE INVENTION

For many years, a pair of superimposed rotary dies with cutting blades on one of both cylinders have been used to cut blanks from a thin web of material passing through the nip of the dies. Typically, the thin web is of a material such as paper, paper board, cardboard, plastic film, metal foil, thin sheet metal and the like.

U.S. Pat. No. 4,608,895 discloses a pair of rotary die cylinders with integral complementary cutting blades thereon which coact to sever a web of material passing through their nip. Each severing blade has an elongate land projecting generally radially outwardly from its cylinder and having in cross section an outer face and spaced apart depending side faces inclined towards each other at an acute included angle, and each inclined to its associated outer face at an obtuse included angle. When the line of severance subtends more than a quandrant, the cutting edge transfers from one side edge to the other of the coacting lands at a pair of cross over sections each having an outer face which is substantially narrower than the outer face of the adjacent portion of the land. To enable proper registration of the coacting lands to cut a web, the pair of die cylinders can be relatively shifted both axially and in rotational phase with respect to each other.

The die is made from a cylindrical blank of tool steel which is hardened and ground to produce a cylindrical surface before it is electrical discharge machined (EDM) to produce the lands with the desired geometry thereon. To produce the desired accuracy and geometry of the lands, they are EDM machined in the hardened cylindrical workpiece utilizing a negative electrode, which is preferably cylindrical with grooves machined in the periphery thereof with a generally V-shape cross section for forming the lands of the die cylinders.

While these die cylinders have been sold commercially and performed satisfactorily for relatively high volume mass production operations, they are expensive and difficult both to manufacture and resharpen when they become worn or dull in use.

SUMMARY OF THE INVENTION

A pair of rotary die cylinders having coacting severing blades formed by integral lands projecting generally radially outwardly from the main body of each cylinder and having in cross section, an outer face and a pair of spaced apart side faces at least one and preferably both of which are essentially perpendicular to the outer face or its chord. A perpendicular side face and the outer face intersect to define a cutting edge on the land, and preferably the other edge is chamfered. To facilitate disengaging the cut blank from the dies, preferably each coacting pair of cutting lands has an associated elongate ejector land located adjacent to them and within the perimeter of the line of severance of the cut blank. The ejector land is integral with the die cylinder having the cutting land disposed outside the cut blank and cooperates with the other cutting land (inside the cut blank) to flex the blank.

The rotary die cylinder is made by machining in the opposed ends of a tool steel workpiece, which is preferably generally cylindrical, a pair of recesses each having a bore with a frusto conical locator surface tapering inwardly with both the of the bores lying essentially on the same common axis of rotation. The tapered bores are used to accurately locate the workpiece while machining a peripheral cylindrical surface on it which is concentric with the common axis of rotation. Utilizing the recesses and frusto conical surfaces, the workpiece is located and oriented relative to a cutting tool to machine away material from the periphery of the workpiece to form the cutting blade lands and any ejector lands. Subsequently, the machined cutting lands are hardened by heat treating utilizing the tapered bores to locate and orient the machined workpiece relative to a laser to direct its beam of electromagnetic energy onto the cutting blade lands to heat them to an elevated temperature from which they are cooled to harden them without substantially hardening the main body of the cylinder.

Objects, features and advantages of this invention are to provide a pair of rotary die cylinders with coacting cutting blades thereon which have a substantially longer useful life in service, require a substantially lower cutting force requiring less power to drive the cylinders and produce less load thereon, substantially reduce the likelihood of cut blanks being caught, trapped or hung up in the die cylinders, having cutting blades which are easier, faster and more economical to resharpen after becoming dull in use, a substantially longer in service useful life, and rotary die cylinders and a method of making them which are significantly less expensive, may be made by machining with conventional cutting tools, enable the cutting blades to be hardened after being formed, and are relatively quick, easy, inexpensive and requires less capital investment to make them.

BRIEF DESCRIPTION OF THE DRAWINGS

These, and other objects, features and advantages of this invention will be apparent from the appended claims, detailed description of the best mode, and accompanying drawings in which:

DETAILED DESCRIPTION

Figure 1:
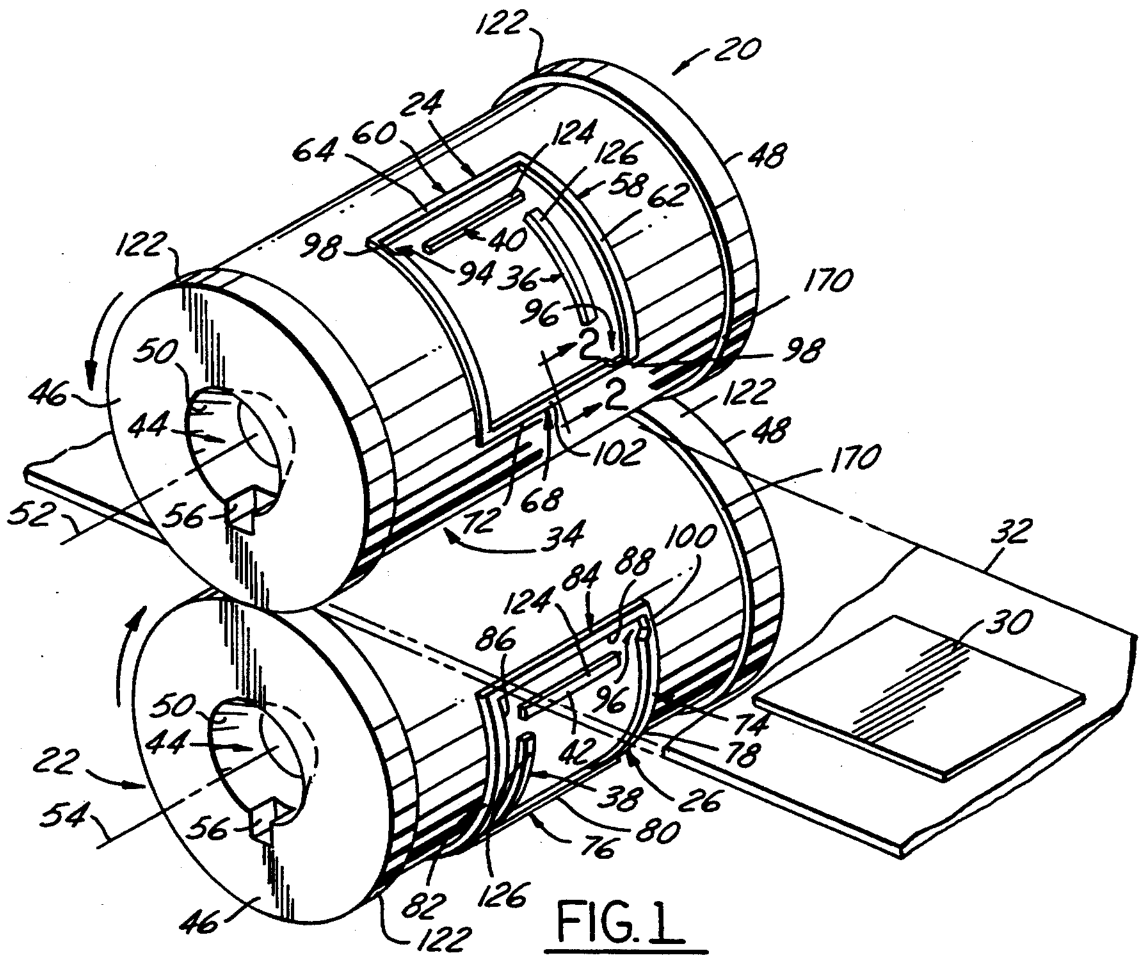
FIG. 1 is a perspective view of a pair of cutting die cylinders embodying this invention for cutting blanks from a web passing through their nip.

Referring in more detail to the drawings, FIG. 1 illustrates a pair of cutting die cylinders 20 and 22 embodying this invention with coacting cutting blades 24 and 26 thereon which when the cylinders are co-rotating cut generally rectangular blanks 30 from a web 32 of thin material, such as paper board, passing through the nip 34 of the die cylinders. Preferably, removal of blanks from the die cylinders is facilitated by pairs of ejector lands 36, 38 and 40, 42 within the perimeter of the cutting blades.

In use, each die cylinder is journalled for rotation by a pair of arbor assemblies having coaxial spindles with opposed noses (not shown), received in complementary recesses 44 in the opposed ends 46 and 48 of each die cylinder. Each recess is a bore with a frusto conical sidewall 50 tapered inwardly from its associated cylinder end which provides a locator surface engagable with a complementary tapered surface on the nose of an associated spindle. For each die cylinder, the frusto conical surfaces of both of its recesses are on the same or common axis of rotation 52 or 54 of the cylinder. In use, each cylinder is driven through one or both spindles of its arbor assembly to co-rotate in opposite directions of rotation (counterclockwise and clockwise as indicated by the arrows in FIG. 1) with essentially the same peripheral surface speed of its cutting blades. One or both spindles are also coupled to their associated cylinder for rotation therewith by a key received in a keyway 56 in the recess of the cylinder. The construction and arrangement of the recesses, keyways and frusto conical surfaces for journalling, locating and driving the die cylinders 20 & 22 is disclosed in greater detail in pending U.S. patent application Ser. No. 08/002,660 filed on Jan. 11, 1993, the disclosure of which is incorporated herein by reference and hence will not be described in further detail.

To produce a clean cut, the dies are constructed so that the position of the cutting edges of the coacting blades 24 and 26 can be varied and adjusted by moving the dies axially and/or in rotary phase relationship with respect to each other. This is accomplished by locating various portions of the cutting edge of the blade and its cutting edge of each die so that relative movement of the dies in one axial direction and/or one rotary phase direction causes all the cutting edges of the blades of both dies to move toward and even overlap each other and movement in the opposite direction causes all the cutting edges of all the blades of both dies to move away from and even be spaced from each other.

If the predetermined line of severance to be cut by the dies subtends more than one quadrant, it is necessary to locate the cutting edge on opposite sides of the blade along different longitudinal portions of the blade. For example, to cut the rectangular blank 30, the blade 24 of the upper die has circumferentially and axially extending land portions 58 and 60 with inner cutting edges 62 and 64 and circumferential and axial land portions 66 and 68 with outer cutting edges 70 and 72 which respectively coact with the lower cylinder blade 28 circumferential and axial lands 74 and 76 with outer cutting edges 78 and 80, and circumferential and axial lands 82 and 84 with inner cutting edges 86 and 88. With this arrangement, axial movement of the upper die cylinder 20 to the left, as viewed in FIG. 1, moves the cutting edges of all the circumferential lands toward one another and movement to the right moves the cutting edges away from one another. Similarly, relative rotational phase movement in one direction moves all of the cutting edges of the axial land portions together and phase rotation in the opposite direction moves them away from one another.

To prevent crushing and provide a clean cut of the web in the areas where the cutting edges shift from one side of the land to the other, coacting crossover sections 94 and 96 are formed in each blade at the points of transition which have very narrow land sections 98 and 100, which in registration, preferably cross generally at right angles to each other. This narrow section is formed by relieving each land opposite its cutting edge which forms a very narrow outer face portion 98 and 100. This relief both prevents the web material from being crushed between the lands where they cross and provides a clearance or space to receive the severed portion of the web when it is cut in a crossover area. Usually, the width of the outer faces 98 and 100 of each land crossover section is in the range of about 0.0002 to 0.008 of an inch, desirably about 0.0005 to 0.005 of an inch, and preferably about 0.001 to 0.002 of an inch. The longitudinal length of this narrow outer face is usually in the range of about 0.010 to 0.150 of an inch, desirably about 0.015 to 0.080 of an inch, frequently about 0.015 to 0.040 of an inch, and preferably about 0.015 to 0.025 of an inch. The layout and arrangement of the land portions, cutting edges, and crossover sections of the coacting blades 26 and 28 of the die cylinders is disclosed and described in greater detail in U.S. Pat. No. 4,608,895 issued on Sep. 2, 1986, the disclosure of which is incorporated herein by reference and hence will not be described in further detail.

Blade Lands

Figure 2:
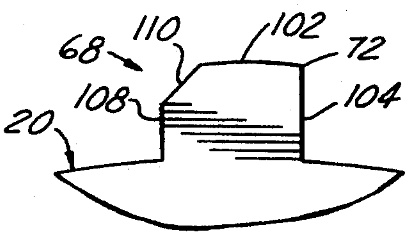
FIG. 2 is a fragmentary sectional view taken generally on line 2—2 of FIG. 1 of a cutting blade land of the upper die.
Figure 3:
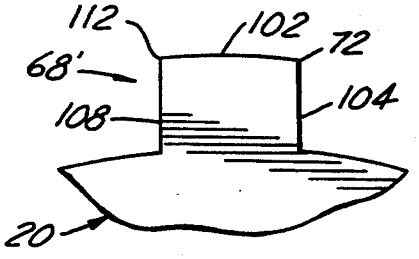
FIG. 3 is a fragmentary sectional view of a modified form of a cutting blade land of the die cylinders.
Figure 12:
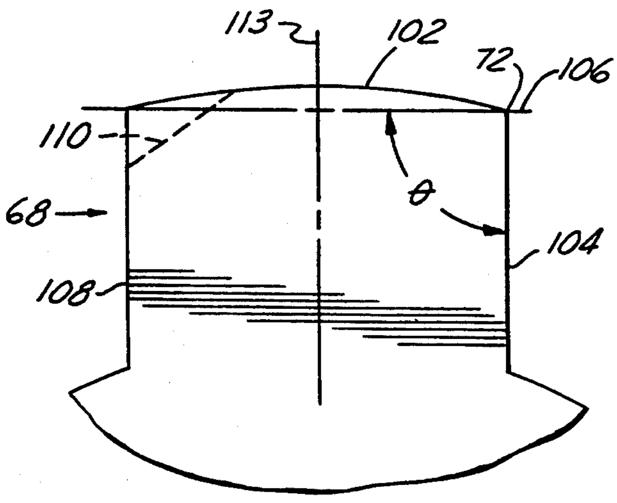
FIG. 12 is an enlarged and fragmentary cross sectional view of the axially extending land portion of the cutting blade of FIG. 11.

In accordance with this invention to provide improved cutting blades and cutting performance, the blade lands have a specific geometry and construction. As shown in FIGS. 1 & 2, the axially extending land portion of each blade has an arcuate outer face 102 and a depending side wall 104 adjacent its cutting edge which, as shown in FIG. 12, is essentially perpendicular or at a right angle to the chord 106 of the arcuate outer face 102. Preferably, the other land sidewall 108 is substantially parallel to the sidewall 104. The intersection of the sidewall 104 and the outer face 102 forms the cutting edge 72 of this blade land portion and preferably, but not necessarily, the other edge is relieved by a chamfer or bevel 110 to facilitate ejection of the cut blank. However, as shown in FIG. 3, in some applications it may be acceptable to omit the chamfer so that the outer face 102 and sidewall 108 intersect to define an edge 112. Preferably, as shown in FIG. 12, the chord is also essentially perpendicular to a radius 113 of the cylinder passing through its axis of rotation 52 or 54 and bisecting the chord 106 or being equally spaced between the parallel sidewalls 104 and 108.

Figure 4:
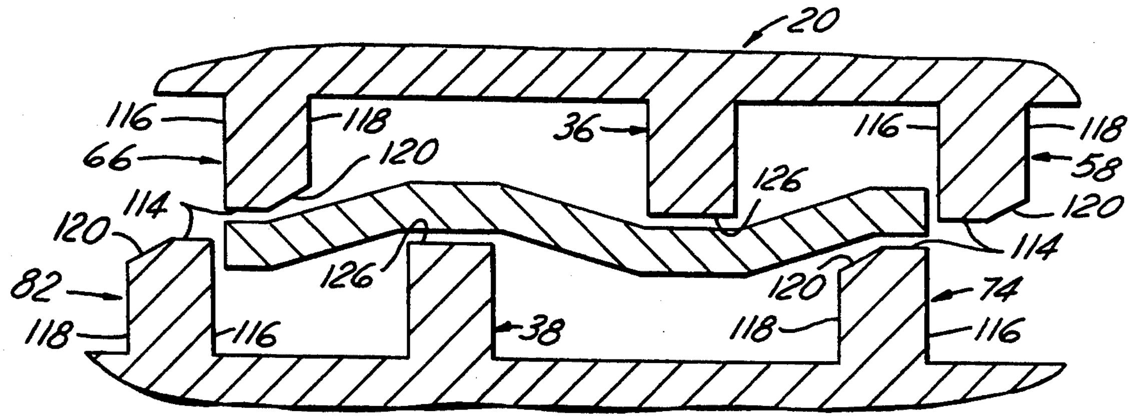
FIG. 4 is a semi-schematic sectional view taken in the plane of the axes of the die cylinders and illustrating flexing of the cut blank by ejector lands of the die cylinders.

Similarly, as shown in FIG. 4, the circumferentially extending land portion of each blade has an outer face 114 which in cross section is a straight line, and a depending sidewall 116 essentially perpendicular to the outer face 114. Since in cross section outer face 114 is a straight line it can be considered to either have no chord or its outer face and chord are one and the same thing. Preferably, the other sidewall 118 is substantially parallel to the sidewall 116. The intersection of the sidewall 116 and the outer face 114 forms the cutting edge of the blade and preferably the other edge has a chamfer or bevel 120 providing relief which facilitates ejection of the cut blank. In some applications the relief may be omitted and the sidewall and outer face will form a substantially right angular edge.

The outer faces 102 & 114 of all of the lands are all concentric with the axis 52 or 54 of their associated cylinder 20 or 22, are all disposed essentially the same radial distance from its axis of rotation and are preferably all formed at substantially the same time by machining a cylindrical peripheral surface on the cylinder coincident with its axis.

This specific construction and arrangement of the lands of the cutting blades has the substantial advantages of significantly increasing the useful life of the die cylinders, substantially reducing the cutting force required to sever or cut a web of material and thereby increasing the useful life of the die cylinders and reducing the power required to rotate the die cylinders, substantially decreasing the likelihood that a cut blank will become caught or hung up in the die cylinder, providing blades which can be easily, quickly and inexpensively sharpened by simply grinding and slightly reducing the radius of the outer faces 102 & 114 of the lands, can be resharpened essentially without changing the size and configuration of the blanks cut by the dies cylinders, eliminates most, if not all, manual or hand grinding and machining to resharpen the blades, enables the cutting blades to be formed by utilizing conventional cutting tools and grinding techniques and eliminates the necessity of electrical discharge machining of the blades on the die cylinders.

Preferably, but not necessarily, each die may have a pair of spaced apart cylindrical bearer surfaces 122 which, when they bear on the complementary die cylinder, prevent the cutting blades from radially overlapping and interfering with each other. The radius of the cylindrical bearer surfaces 122 must be no less than the radius of the outer faces 102 & 114 of the cutting blades and preferably are formed simultaneously with the outer faces and may have the same or a slightly larger radius.

Ejector Lands

In accordance with another feature of this invention, and as shown in FIGS. 1 and 4, removal of a cut blank 30 from the nip 34 of the die cylinders may be facilitated by the ejector lands 36, 38, 40 & 42 which are located within the perimeter of the cutting blade of their associated die cylinder. As shown in FIG. 4, each ejector land is associated with a pair of coacting blade lands and extends generally parallel to and is disposed inwardly thereof. In operation, the lands flex or bend the somewhat resilient blank 30 adjacent its edges as it is being cut so that as it emerges from the nip of the die cylinders it tends to spring back to its unflexed generally flat condition thereby disengaging from the sidewall 104 or 116 of the associated cutting land with which the cut edge of the blank is radially overlapped in the nip. With respect to its associated pair of cutting lands, the ejector land is disposed on the same die cylinder as the cutting land with which the cut edge of the blank radially overlaps in the nip and is spaced therefrom so that the other cutting land on which the blank bears is disposed between them. For example, in FIG. 4, the ejector land 36 associated with cutting lands 58 & 74 is on cylinder 20 and the ejector land 38 associated with cutting lands 66 & 82 is on the cylinder 22.

In cross section, the outer face 124 of the axially extending ejector lands 40 & 42 is preferably arcuate and in cross section the outer face 126 of the circumferentially extending lands 36 & 38 is preferably a straight line. Preferably, the outer faces of all of the ejector lands have the same radius as the outer faces of the cutting blade lands of the same cylinder on which the ejector lands are disposed and may be formed at the same time by machining a cylindrical surface coincident with the axis of the die cylinder.

Typically, in cross section the cutting blade and ejector lands have a radial height of about 0.010 to 0.125 of an inch, and desirably about 0.020 to 0.090 of an inch, and preferably about 0.060 to 0.080 of an inch, and a transverse width of about 0.040 to 0.150 of an inch, desirably 0.075 to 0.140 of an inch, and preferably 0.100 to 0.125 of an inch.

Of course, if desired, the ejector lands may be interrupted or discontinuous and in their plan view have other shapes such as arcuate, circular, oval, square, a series of discrete segments, etc. Similarly, the shape of the sidewalls of the ejector lands is not critical and in cross section they may be other than straight, such as arcuate.

Figure 5:
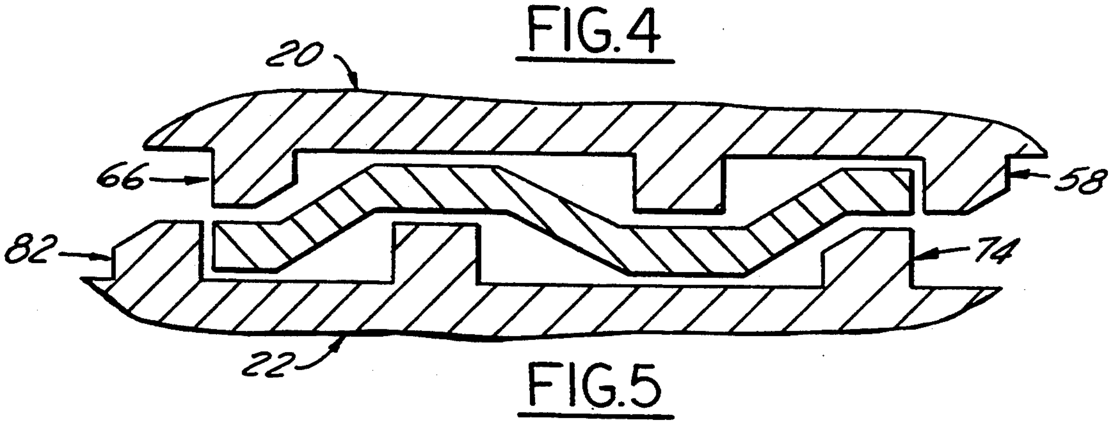
FIG. 5 is a fragmentary sectional view similar to FIG. 4 illustrating ejector lands and the cutting blade lands after they have been resharpened.

As shown in FIG. 5, when after use the cutting blades are resharpened, such as by grinding the outer faces of the lands of the blades and the ejectors, even though the extent of their radial projection is reduced, they still maintain the proper relationship and registration for both cutting the blank and flexing or bending it to facilitate ejection of the cut blank from the the die cylinders. Indeed, even when sharpened the ejector lands flex or bend the cut blank to the same extent as they did before resharpening so long as in use the same radial gap or clearance is maintained between the cutting blades of the die cylinders. As shown in FIG. 5, resharpening of the cutting blades makes no change in the axial or lateral width of the cut blank and virtually no change in the circumferential or longitudinal length of the cut blank because the sidewall 104 or 116 of each land adjacent its cutting edge is essentially perpendicular to the outer face 102 or 114 of the land or its chord 106.

Using the Die Cylinders

To use the rotary dies 20 & 22, they may be journalled for rotation in superimposed relation by a die stand having for each die cylinder a pair of spaced apart arbors with opposed spindles having noses complementary to and received in the recesses 44 in the opposed ends 46 & 48 of each cylinder. Typically, the spindles are driven in timed relationship through a gear train by a suitable prime mover, such as an electric motor. Usually, the gear train includes a mechanism permitting the angular or rotary phase relationship of the die cylinders to be adjusted for registration of the coacting and generally axially extending land portions of the cutting blades. The arbor assembly also contains a suitable mechanism for relatively axially shifting one of the pair of die cylinders to provide proper registration for the coacting cutting edges of the generally circumferentially extending land portions of the cutting blades. Since a suitable die stand with arbors for journalling and driving the die cylinders and mechanism for adjusting their axial and rotary phase relationship is disclosed and claimed in U.S. patent application Ser. No. 08/002,660 filed on Jan. 11, 1993, the disclosure of which is incorporated herein by reference, it will be not be described in further detail.

In use, the pair of die cylinders 20 & 22 are corotated in opposite directions of rotation with the same peripheral surface speed of the outer faces of their cutting blades with the web 32 of material passing through their nip 34 at the same lineal surface speed. In the nip the blade lands coact to cut a blank 30 from the web. The ejector lands 36, 38, 40 & 42 greatly reduce the likelihood of the cut blank becoming caught or hung up in the blades. It is believed the ejector lands reduce the tendency of the cut blank to hang up because (1) they bend or flex the blank which tends to foreshorten both its axial or lateral width and its longitudinal or circumferential length thereby providing increased clearance between its edges and the cutting blades, and (2) due to the resiliency of the cut blank as it emerges from the nip of the die its leading edge tends to move radially away from and out of radial overlapping engagement with the immediately adjacent cutting blade land 60. Furthermore, the right angular sidewall 104, 116 of the cutting blades decrease the tendency of the edge of the blank to hang up thereon compared to the inclined or raked sidewalls of prior art cutting blades. Regardless of any theoretical explanation, the ejector lands significantly reduce the tendency or likelihood of the cut blanks to hang up or jam in the die cylinders.

Method of Making the Die Cylinders

Figure 6:
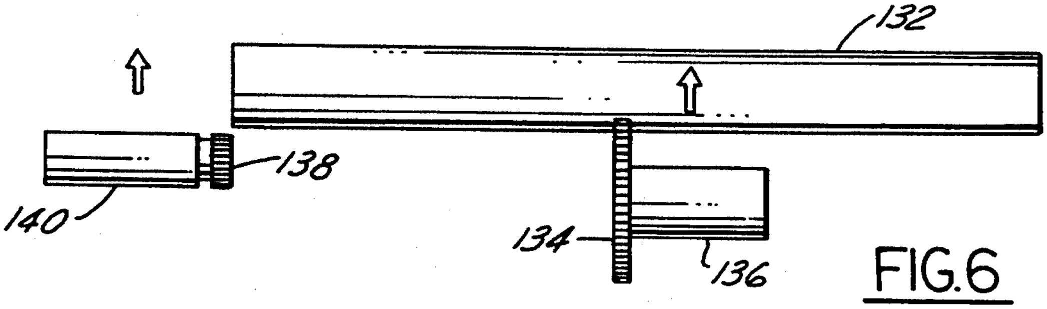
FIG. 6 is a semi-schematic side view illustrating the cutting off and machining of the ends of a piece of tool steel bar stock to form a generally cylindrical workpiece from which a die cylinder is made in accordance with the process of this invention.

In accordance with this invention, the die cylinders can be made by machining with conventional cutting tools and grinding a workpiece of unhardened tool steel to completely form the lands of the ejector and cutting blades and thereafter hardened by heat treating the cutting blades for increased useful life without hardening the core or body of the cylinder. This avoids distortion of the cutting blades which would adversely affect their geometry and performance. As shown in FIG. 6, a generally cylindrical workpiece 130 for making a die cylinder 20 or 22 can be cut off from a piece of round bar stock 132 of tool steel by a rotating milling cutter 134 received in a drive spindle 136 of a suitable machine tool. The milling cutter also machines one end face of the workpiece and the other end face can be simultaneously machined by a rotating end mill cutting tool 138 received in a drive spindle 140 to provide the workpiece 130 with end faces 46 & 48 substantially perpendicular to its longitudinal axis and of the desired length of the die cylinder.

Figure 7:
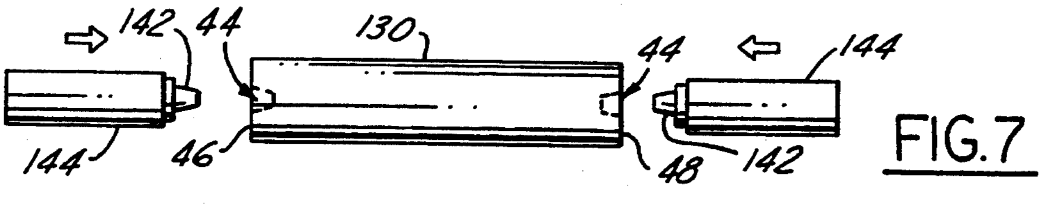
FIG. 7 is a semi-schematic side view illustrating the machining of recesses with tapered bores having frusto conical locator surfaces in the opposed ends of the workpiece.
Figure 8:
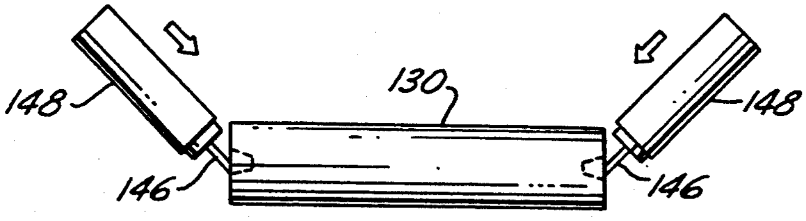
FIG. 8 is a semi-schematic side view illustrating the machining of keyways in the recesses of the workpiece.

As shown in FIG. 7, the recesses 44 are machined in the workpiece with the frusto conical locator surfaces 50 on a common axis, preferably simultaneously, by two opposed rotating boring tools 142 in drive spindles 144 of a suitable machine tool. Thereafter, as shown in FIG. 8, the keyway 56 can be machined in one or both recesses of the workpiece by rotating milling tools 146 received in drive spindles 148 of a machine tool. If desired, all of the machining operations of FIGS. 6, 7 and 8 can be formed with the same machine tool, such as a computerized numerical control (CNC) machining center having drive spindles movable along three orthogonal axes.

Figure 9:
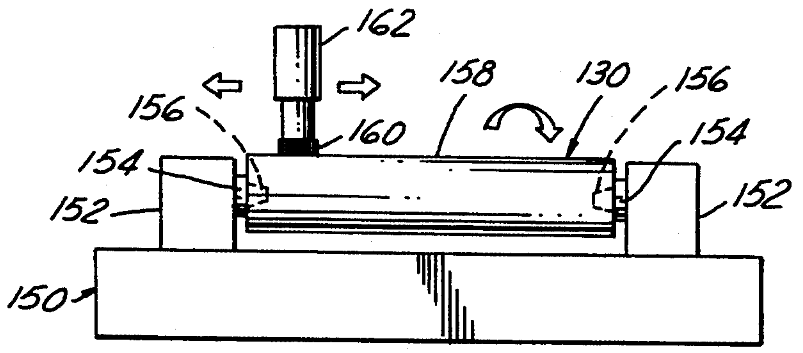
FIG. 9 is a semi-schematic side view illustrating the machining of a cylindrical peripheral surface on the workpiece concentric with the common axis of the tapered bore conical locator surfaces.

As shown in FIG. 9, to form the outer faces 102 & 114 of the cutting lands (and preferably the outer faces 124 & 126 of the ejector lands), the workpiece 130 is accurately located and rotated in a machine tool 150 by arbors 152 with spindles 154 having complementary noses 156 engaging the recesses 44 in the ends of the workpiece. A cylindrical surface 158 concentric with the common axis 52 or 54 of the recesses is machined on the workpiece by a suitable tool, such as an end mill 160, rotated and axially reciprocated by a drive spindle 162 of the machine tool while the workpiece 130 is rotated by the machine tool.

Figure 10:
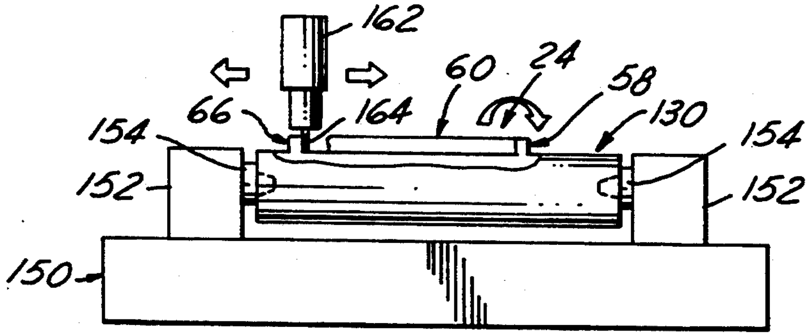
FIG. 10 is a semi-schematic side view illustrating machining of a portion of the periphery of the workpiece to form a cutting blade land thereon.
Figure 11:
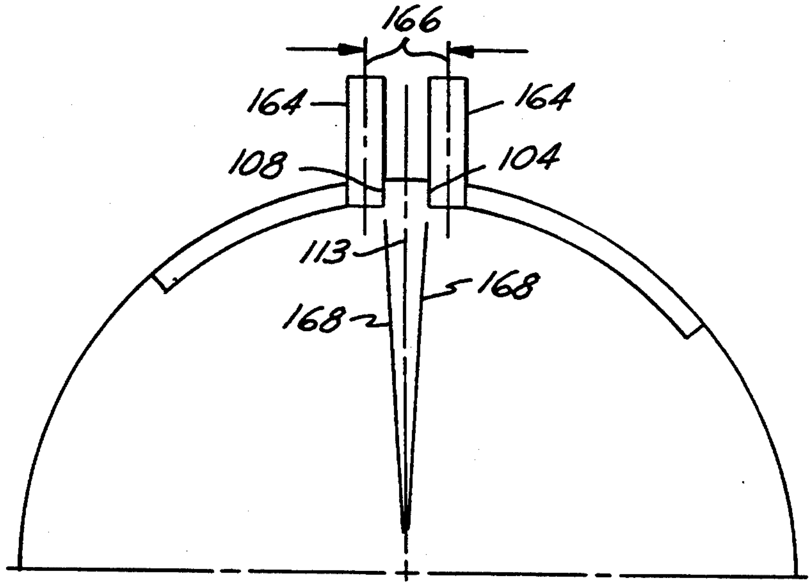
FIG. 11 is an semi-schematic and enlarged sectional view of the workpiece illustrating the orientation of cutting tools for removing material from the workpiece to form an axially extending land portion of the cutting blade thereon.

As shown in FIG. 10, the lands of the cutting blades and ejectors are formed in the workpiece by machining away portions of the periphery of the workpiece. Preferably, peripheral portions are machined away in rough and finish cuts by a milling tool 164 rotated and moved along various axes by the spindle 162 in coordination with angular or arcuate movement of the workpiece 130 about its axis by the arbor spindles 154. Preferably, the coordinated movement of the spindle 162 and the workpiece 130 is performed by a computerized numerical control machines tool 150 having at least three orthogonal axes of movement of the spindles relative to the workpiece and one arcuate or rotary axis of movement of the workpiece relative to the spindle. Preferably, this machining is performed on a so-called five axis or six axis computerized numerical control machine tool 150.

As shown in FIGS. 1 & 12, when machining the sidewall 104 (and preferably also sidewall 108) of a generally axially extending cutting land (60, 68, 76 or 84) the axis 166 of rotation of the cutting tool 164 is oriented so that it is essentially perpendicular to the chord 106 of the arcuate outer face 102 and hence is not parallel with and is skewed to a radius 168 of the workpiece which intersects the plane of the side face of the blade being machined by the cutting tool. With a CNC machine tool it is feasible and practical to machine the side faces of all of the land portions of the cutting blades so they are essentially perpendicular to the cord of the corresponding outer face regardless of whether such land portion of the cutting blade extends axially, circumferentially or obliquely on the cylindrical workpiece, and hence the finished die cylinder. After machining the sidewalls of the blade lands, the bevelled edge 110 can be machined with an end milling tool received in the spindle 162 of the CNC machine tool.

In a similar manner, the sidewalls of the ejector lands 36, 38, 40 & 42 can be machined by the rotating milling tool 164 in the drive spindle 162 of the CNC machine tool. The sidewall 170 of each bearer 122 can also be machined with the milling tool 164 by the CNC machine tool 150.

As will be appreciated, after machining away peripheral portions of the workpiece and machining the sidewalls of the blade and ejector lands their outer faces are the remaining portions of the cylindrical surface 158 previously machined on the workpiece 130. However, if desired, the outer faces of the blade and ejector lands could be machined after, rather than before, their sidewalls by the CNC machine tool 150, although it is preferable to machine them beforehand.

Figure 13:
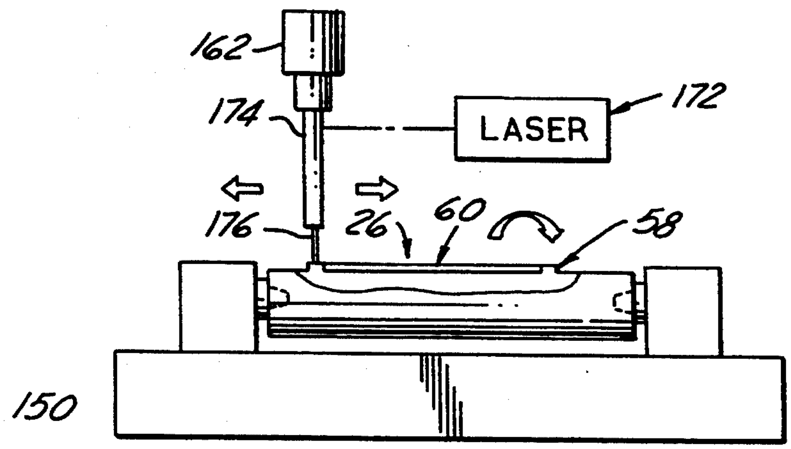
FIG. 13 is a semi-schematic side view of a laser directing electromagnetic energy onto a machined cutting blade of the steel workpiece to heat it to an elevated temperature for hardening or heat treating the cutting blade without hardening the core or main body of the workpiece.

After machining is completed, as shown in FIG. 13, the cutting blade lands can be hardened by heating them to an elevated temperature typically about 1000° F. to 1200° F. with a laser 172 and quenching them without substantially hardening the core or body of the workpiece 130 and hence without distorting it by heat treating it. The emitter 174 of the laser 172 can be received in the spindle 162 of the CNC machine tool for orienting and manipulating it to direct its beam 176 of coherent electromagnetic radiation onto each cutting blade land of the workpiece 130 while it is received and located by its recesses 44 on the arbors 152 of the machine tool and arcuately moved by them as needed to direct the laser beam onto the cutting lands. Preferably, the heated lands are quenched to cool and harden them by air cooling or if needed to control the rate at which they are cooled by contacting the blades with a suitable quenching liquid, such as by spraying, pouring or directing a stream of the liquid onto the blades or immersing the blades in the liquid.

When the cutting blades of the die cylinder become dull from use, they can be resharpened such as by grinding the outer faces of the cutting lands while the workpiece 130 is located by its recesses 44 to produce outer faces of the cutting blade lands which are essentially concentric with the axis of rotation of the workpiece.

This method of making the die cylinders has the substantial advantages of utilizing conventional cutting tools and CNC machine tools, machining the workpiece before the cutting blades are hardened, producing highly accurate and precise die cylinders, eliminating the need for electric discharge machining, and being relatively quick, easy, economical and requiring significantly less capital investment to produce rotary dies.

What is claimed is:

1. Rotary dies which define a nip therebetween for cutting a web of material passing through the nip, said rotary dies comprising: a pair of coacting die cylinders of metal constructed and arranged to be journalled for co-rotation, at least one pair of coacting elongate severing blades with one blade of each pair disposed on one of said die cylinders, each severing blade comprising an elongate land projecting generally radially outwardly from and integral with its associated die cylinder, each said elongate land having an outer face and spaced apart and generally depending side faces, said outer face having a width of at least 0.040 of an inch, in cross section at least one of said side faces of each land being essentially perpendicular to said outer face if said outer face is linear or to a chord of said outer face if said outer face is arcuate, said one side face and said outer face of each land intersecting to define a cutting edge on the land thereof, said coacting severing blades of each pair being constructed, arranged and positioned on their respective die cylinders so that during co-rotation of said pair of die cylinders the cutting edges of said coacting severing blades of each pair which are immediately adjacent cut the web therebetween along a predetermined line of severance while the other edges of the coacting severing blades are on generally opposite sides of the line of severance, the line of severance subtending more than one quadrant, and at least one pair of coacting crossover sections each in one blade of said pair of severing blades, each said crossover section having a narrow segment of its outer face with a maximum width substantially less than the maximum width of adjacent portions of the outer face of its associated blade, said narrow segment lying immediately adjacent the line of severance and extending at least to the point where the cutting action of said coacting severing blades transfers over from one cutting edge to the other cutting edge of said lands of said severing blades, whereby the pair of die cylinders may be shifted generally axially with respect to each other and shifted in rotational phase relationship with respect to each other so that an appropriate relationship between all of the severing blades thereof is maintained for cutting the web along the predetermined line of severance.

2. The dies of claim 1 wherein the maximum width of the outer face of each of said lands is in the range of about 0.04 to 0.15 of an inch.

3. The dies of claim 1 wherein the maximum width of the outer face of each of said lands is in the range of about 0.100 to 0.125 of an inch.

4. The dies of claim 1 wherein the outer face of each of said lands is disposed generally radially outwardly of the main body of its associated die cylinder in the range of about 0.010 to 0.125 of an inch.

5. The dies of claim 1 wherein an edge of each land spaced from said cutting edge has a chamfer thereon.

6. The dies of claim 1 which also comprises an elongate and rigid ejector land associated with said one pair of coacting severing blade lands and received on and integral with one of the die cylinders within the perimeter of the line of severance and extending generally parallel to a portion of said pair of coacting severing blade lands so that in cross section one of said blade lands is positioned between the other of said blade lands and said ejector land so that as a portion of material is cut from the web its opposed side faces bear on and are flexed by the cooperation of said ejector land and said one blade land received between said ejector land and said other blade land.

7. The dies of claim 6 wherein said ejector land has an outer face radially co-terminous with the outer face of said associated blade land integral with its associated die cylinder.

8. The dies of claim 7 wherein in cross section the outer face of said ejector land has a width in the range of about 0.04 to 0.15 of an inch.

9. The rotary dies of claim 1 wherein each die cylinder has a pair of recesses in its opposed ends for removably receiving spindles for journaling said die cylinders for co-rotation, each recess having a frusto conical locator surface therein for complimentary mating engagement with one of the spindles to accurately locate the one spindle on its respective die cylinder, and the frusto conical locator surfaces of each die cylinder being coaxial with each other and concentric with the axis of rotation of the die cylinder.

* * * * *